(No Model.)
P. G. GARDNER.
SPROCKET WHEEL AND CHAIN.
No. 566,750. Patented Sept. 1, 1896.
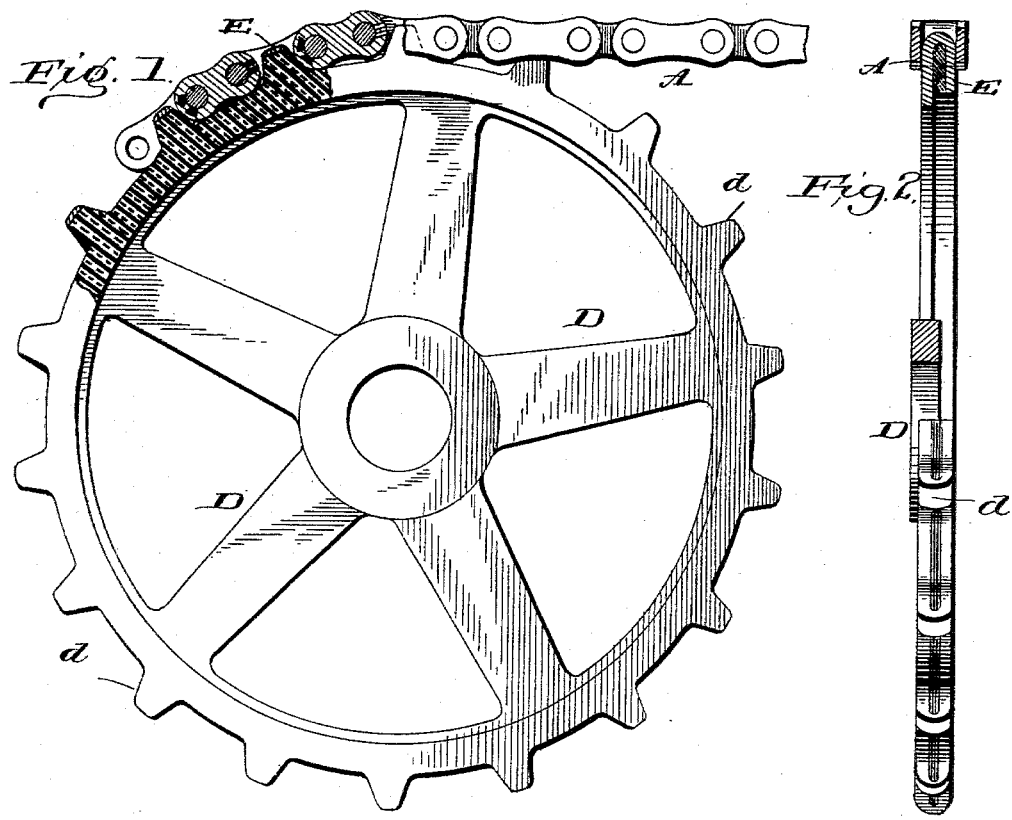
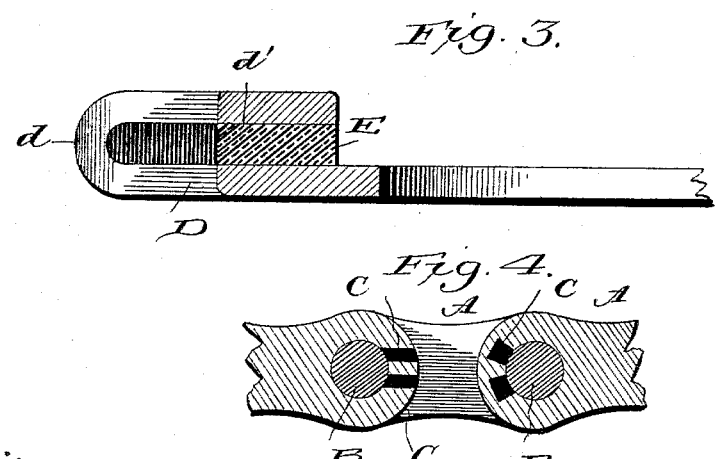
Witnesses:
L. C. Hills
E. H. Bond
Inventor:
Perry G. Gardner
By E. B. Stocking
Atty.

UNITED STATES PATENT OFFICE.

PERRY G. GARDNER, OF BOUND BROOK, NEW JERSEY, ASSIGNOR OF SEVEN-SIXTEENTHS TO HORATIO V. S. NEGUS, OF SAME PLACE.

SPROCKET WHEEL AND CHAIN.

SPECIFICATION forming part of Letters Patent No. 566,750, dated September 1, 1896.

Application filed May 7, 1896. Serial No. 590,570. (No model.)

*To all whom it may concern:*

Be it known that I, PERRY G. GARDNER, a citizen of the United States, residing at Bound Brook, in the county of Somerset, State of New Jersey, have invented certain new and useful Improvements in Sprocket Wheels and Chains, of which the following is a specification, reference being had therein to the accompanying drawings.

This invention relates to certain new and useful improvements in sprocket wheels and chains.

It has for its object, among others, to provide for a perpetual lubrication of the parts. The sprocket is provided with a reservoir or chamber containing a lubricant of any suitable character, such as wax, lead, soapstone, mica, graphite, or the like, compressed therein, and the chain is also provided with a lubricant for the pins or bearings of the links thereof.

Other objects and advantages of the invention will hereinafter appear, and the novel features thereof will be particularly pointed out in the appended claims.

The invention is clearly illustrated in the accompanying drawings, which, with the letters of reference marked thereon, form part of this specification, and in which—

Figure 1 is a side elevation of a sprocket-wheel and portion of a chain, with portions broken away to better show the interior construction. Fig. 2 is an edge view of Fig. 1, with portions broken away. Fig. 3 is an enlarged sectional detail of a portion of the sprocket-wheel, and Fig. 4 is an enlarged sectional detail of a portion of the chain.

Like letters of reference indicate like parts throughout the several views.

Referring now to the details of the drawings by letter, A designates the links of the chain, which may be of any well-known or approved form of construction, and B are the pins or bolts connecting the overlapping ends of the links, and on which the said links move as upon pivots in the ordinary manner.

C is a compressed lubricant of any suitable nature. It may be wax, lead, graphite, soapstone, mica, or any composition in use for such purpose, and it may be retained in the links in any suitable manner. At the left in Fig. 4 I have shown this lubricant as inserted and retained in openings or sockets in the link and extending from the outer periphery thereof in the direction of the length of the chain, so that the lubricant bears against the pin, while at the right in Fig. 4 I have shown the link as formed with chambers or sockets, preferably dovetailed, in which the lubricant is compressed and held, the same being arranged to bear against the pin, so as to form a perpetual lubricator therefor. Other ways, however, of retaining the lubricant in place may be provided.

D is the sprocket-wheel, which may be of any desired form of construction, in this instance being shown as of that form in which the teeth $d$ are formed by the bend of the metal of which the wheel is formed, as illustrated best in Figs. 2 and 3. This forms a keyway or groove $d'$, and into this keyway is compressed the lubricant E, which may be of any suitable character and which is held therein not only in the spaces in the depressions between the teeth, but also in the groove or socket or recess formed in the teeth themselves, so that lubricant is provided along the entire face of the sprocket-wheel. This, as will be seen from Fig. 1, forms a continual, perpetual self-lubricator for the chain.

It is evident that the sprocket-wheel or the chain hereinbefore described may be used independently of each other, but when combined together form a most efficient bicycle-gearing. The lubricant may be otherwise confined or held in the sprocket-wheel, and other modifications in detail may be resorted to without departing from the spirit of the invention or sacrificing any of its advantages.

The blocks or links of the chain may be provided with screw-threads into which the lubricant may be placed, so that as the pins, which are unthreaded, move therein the lubricant will be applied to all parts thereof. These I should consider as clearly within the scope of my invention and as covered by the claims therefor.

Having thus described my invention, what I claim as new, and desire to secure by Letters Patent, is—

1. A sprocket-wheel provided with a lubricating substance held thereupon and compressed between portions thereof; substantially as described.

2. A sprocket-wheel having a lubricant held in a compressed condition between the metal of the teeth thereof; substantially as described.

3. A sprocket-wheel having a lubricant held compressed in the teeth thereof and in the space between the teeth; substantially as described.

4. A sprocket-wheel having a lubricant held in an annular space at the periphery of said wheel; substantially as described.

5. A sprocket-wheel having a lubricant held in an annular space at the periphery of said wheel, and extending also into the teeth thereof; substantially as described.

6. A sprocket-wheel having the metal at its periphery bent to form the teeth and having an annular socket combined with a lubricant compressed into said socket and extending into the teeth; substantially as described.

7. The combination with a sprocket-wheel having a lubricant confined in a socket about the periphery thereof, of a sprocket-chain having a lubricant confined in sockets in its links and bearing against the pins connecting said links; substantially as described.

In testimony whereof I affix my signature in presence of two witnesses.

PERRY G. GARDNER.

Witnesses:
HENRY C. SUYDAM,
HORATIO V. S. NEGUS.